April 24, 1951  C. JOHNSON  2,549,971
CONTROL SYSTEM

Filed July 2, 1945  2 Sheets-Sheet 1

INVENTOR.
CLARENCE JOHNSON
BY
Raymond W. Jenkins
ATTORNEY

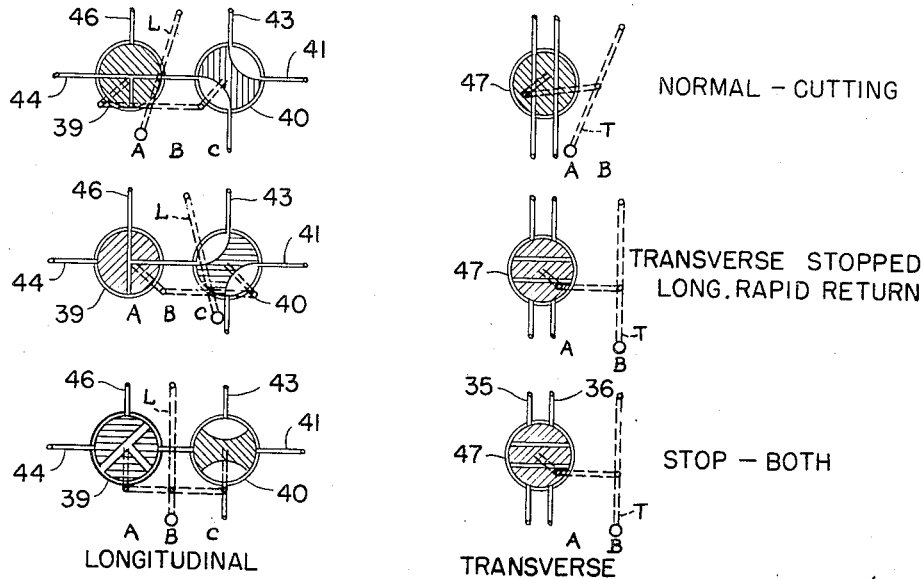
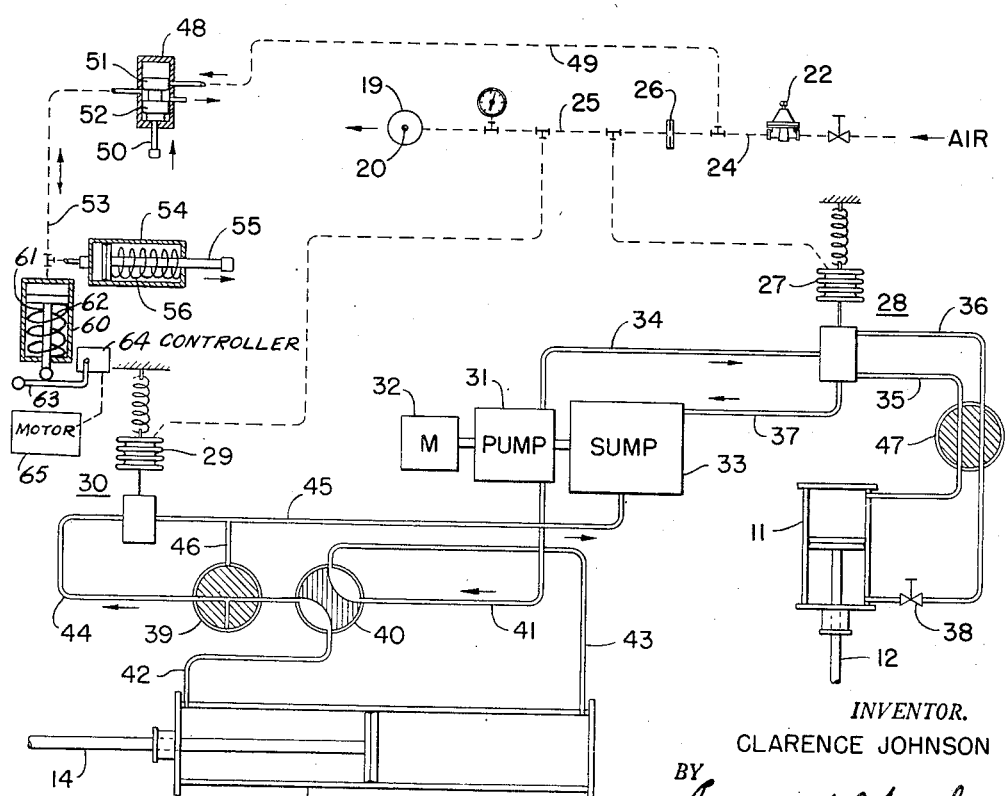

Patented Apr. 24, 1951

2,549,971

UNITED STATES PATENT OFFICE 2,549,971

CONTROL SYSTEM

Clarence Johnson, South Euclid, Ohio, assignor to Bailey Meter Company, a corporation of Delaware Application July 2, 1945, Serial No. 602,837

14 Claims. (Cl. 82—14)

This invention relates to duplicators for controlling the operation of a material forming machine so that a work piece is formed to a contour or configuration determined by a template, pattern, sample, cam or the like.

In accordance with my invention the template or cam for producing the desired configuration on the work piece is scanned by a tracer regulating the discharge of a fluid from a valve or nozzle to the atmosphere. Variations in the shape of the template cause corresponding changes in the rate of fluid discharged from the nozzle, which variations are then used to control the relative positioning of the tool and work piece.

Further, in accordance with my invention the changes in fluid pressure control the relative positioning of the tool and work piece through hydraulic relays and servo-motors to the end that ample power is available for accurately positioning the tool relative to the work piece, or vice versa.

Obviously a duplicator or contour control of the type forming the subject matter of my invention may be employed with material forming machines or machine tools of various types, such as milling machines, lathes, slotters, planers, die sinking machines or other machines in which the relative feed between the tool and the work may be suitably controlled. By way of example I illustrate and will describe my invention as applied particularly to metal turning lathes. Further applications and modifications of my invention will be readily apparent.

In the drawings:

Fig. 2 is a diagrammatic illustration of the pneumatic and hydraulic control circuits employed in the embodiment of my invention shown in Fig. 1.

Fig. 3 is a transfer valve arrangement of Figs. 1 and 2.

Figure 1:
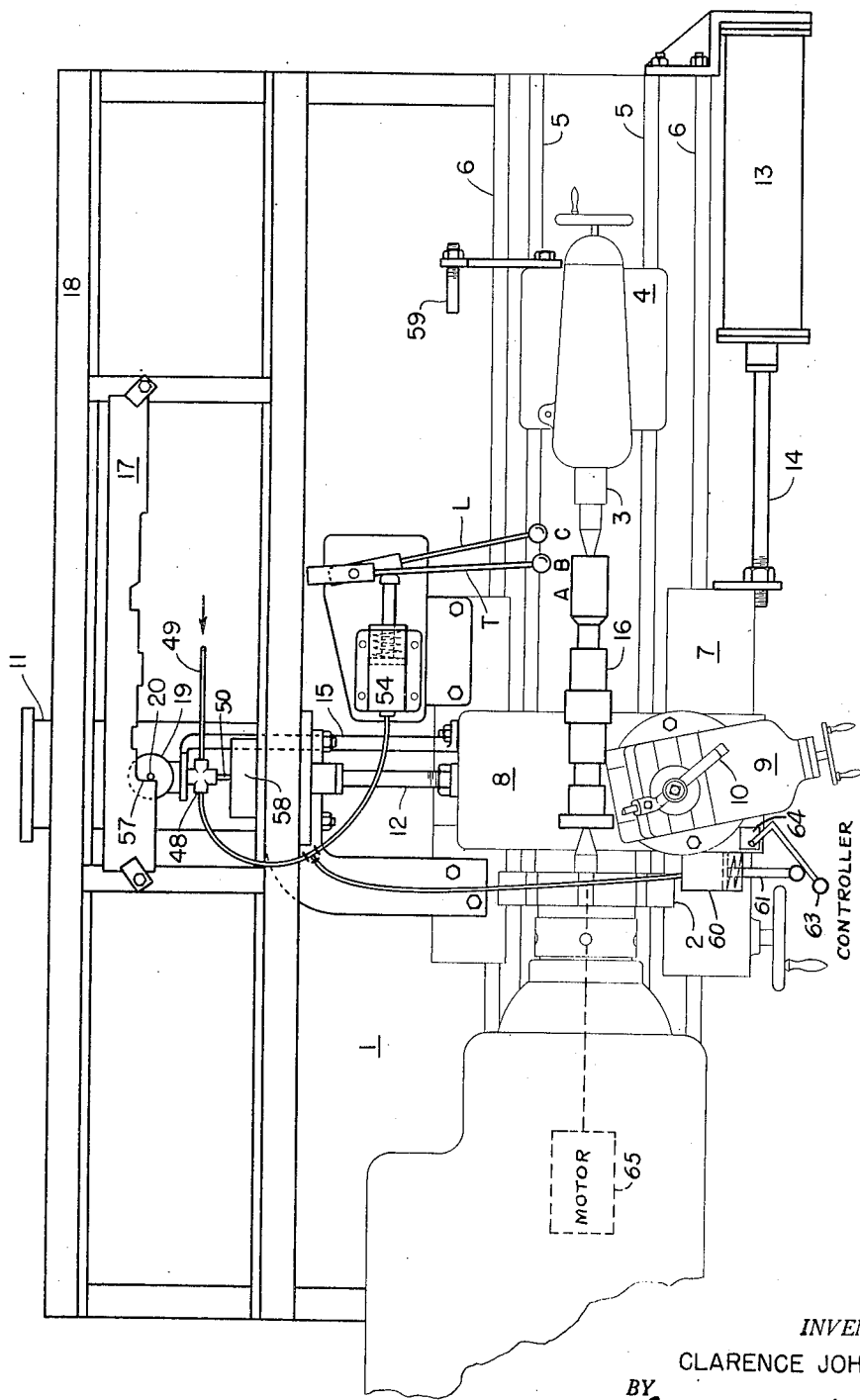
Fig. 1 is a plan view of an engine lathe illustrating the application of my invention thereto.

As is well understood by those familiar with the art, in some machine tools, such as lathes, the tool is moved longitudinally and transversely of the work piece which, except for rotation about its center, remains stationary. In other machine tools, such as some types of milling machines, the work piece may be moved in two directions, while the tool, except for rotation about its axis, remains stationary. In some other types of milling machines, and usually in die sinking machines, the tool may be moved in one or more directions and the work piece may also be moved in one or more directions. In all instances it will be observed however that it is the relative movement between the tool and work piece that causes the work piece to be formed to a desired shape. As one specific embodiment I have chosen to illustrate and describe my invention incorporated in a lathe wherein the work piece, except for rotation about its center, remains stationary and the tool is moved transversely and longitudinally thereof. It will be evident that my invention is applicable to a wide variety of machine tools and that when I speak of relative movement between the tool and work piece I include either an arrangement where the tool is stationary and the work piece is moved, or where the work piece is stationary and the tool is moved, or a combination of the two.

The pattern or template has a shape corresponding to the desired path of movement of the tool to produce a desired finished work piece. By "corresponding" is meant that not only is the pattern or template the same shape as the desired work piece, either in greater or smaller proportion thereto, but also that the pattern or template is in any desired distorted shape to compensate for characteristics of the machine. While the pattern or template must "correspond" to the desired work piece, it is not necessarily identical in contour, and therefore the term "correspond" implies that the pattern or template is purposely designed to result in a desired contour of the work piece to be produced.

Throughout the following specification and in the claims I have indicated that the work piece is formed to correspond to the profile or shape of the master. By such language I do not intend to imply that the work piece is brought to the exact shape of the master, but as will be evident to those familiar with the art the master will be formed so that the ultimate shape of the work piece produced is that desired, and that therefore the shape of the work piece will differ from that of the master by the amount of angularity, etc., in the mechanism. Furthermore, I use the terms contour, profile, shape and the like in a broad sense and not with any limiting distinction between the profile of a two dimensional silhouette or the surface configuration of a body for example. In general, the pattern dictates the desired shape of the work piece. I use profile and contour interchangeably. The pattern has the desired shape, although not necessarily the exact shape.

By strict definition one might be lead to believe that "profile" is only the edge shape of a two dimensional silhouette for example. Usually it is spoken of as the edge shape of a thin plate template, although such a template is a three dimensional object. Usually "contour" is a surface configuration, or at least of a portion of the surface of a three dimensional object. Applicant intends to make it clear that in speaking of profile or contour he means the forming of a work piece to a shape as dictated by that of a template or pattern and without any specific or limiting meaning being given to the terms "profile" and "contour."

Referring now to Fig. 1, I show my invention applied to an engine lathe 1 having a head stock 2 adapted to be rotated by any suitable means, such as by the headstock motor 65. The carriage 4 is movable longitudinally along the bed of the lathe in suitable ways 5 and supports the tail stock 3. Also movable longitudinally along the bed of the lathe in suitable ways 6 is a carriage 7 upon which is mounted a cross-slide 8 movable on ways transversely of the bed of the lathe.

The cross-slide 8 is provided with an adjustable tool support 9 in which is secured a tool 10. Transverse movements of the tool 10 are produced through the agency of a hydraulic cylinder 11 having a piston adapted to position the cross-slide 8 through the agency of a piston rod 12. Longitudinal movements of the tool 10, that is movement of the tool parallel to the bed of the lathe in a longitudinal direction, are produced by means of a hydraulic cylinder 13 having an operating piston rod 14 whose external movable end is fastened to the carriage 7 for moving the same.

Supported by the head stock 2 and the tail stock 3 is a work piece 16 which for illustrative purposes is shown as being formed as a stepshaft by the tool 10. This particular shape has no significance, it being apparent as the description proceeds that by my invention the work piece 16 may be formed automatically to any desired contour. The master template or cam 17 is rigidly held in relation to the work piece 16 upon any convenient extension 18 of the lathe bed. The profile of the template 17 is the contour which it is desired to reproduce upon the work piece 16. For contacting and following the profile of the template 17 I provide a tracer assembly 19 rigidly mounted to and movable with the cross-slide 8 by a bracket arm 15. The tracer 19 may be of the type disclosed and claimed in the copending application of Frederick A. Barnes, Serial No. 542,920, filed June 30, 1944, and now Patent No. 2,436,373, granted February 24, 1948, as having a vertical extension 20 adapted to contact the front edge or profile of the template 17. The body member or housing 19 is adjustably mounted to the bracket 15 and the tracer extension or arm 20 is carried with the body member.

Suffice it to say here that the tracer arm 20 continually scans the profile of the template 17 and controls the bleed to atmosphere of a substantially constant pressure supply of compressed air. The variable bleed or rate of flow of air to the atmosphere produces corresponding or proportional changes in back pressure or pressure of the air effective to cause a positioning of the piston rods 12 and 14 for transverse and longitudinal movements respectively of the tool 10.

In Fig. 2 I have shown diagrammatically the pneumatic and hydraulic circuits for controlling the servomotors 11 and 13 by the tracer 19 in such manner that the motor 11 will position the cross-slide, and consequently the tool 10, transversely of the lathe, or in other words toward or away from the work piece 16 as the tool is traveling longitudinally along the work. The action is such that if the contacted edge of the template 17 is a straight line parallel to the axis of the work piece 16, then the work piece 16 will be turned to cylindrical form. If the contacted edge of the template 17 is a straight line, but inclined to the axis of the work piece 16, then the work piece 16 will be shaped to a taper. The particular showing of Fig. 1 is a stepped surface on the contacted edge of the template 17, and thus the form which is to be produced on the work piece 16.

Air under pressure from any convenient source is passed through a pressure regulator 22 to a header 24 from which a branch 25 leads through an orifice 26 to the tracer assembly 19. As the discharge from the tracer 19 to the atmosphere varies, the pressure in the branch 25 between the orifice 26 and the tracer assembly 19 will vary and such controlled air pressure representative of changes in contour of the template 17 is effective upon a bellows 27 of a pilot valve assembly 28 and simultaneously upon a bellows 29 of a fluid resistance assembly 30. The pilot valve 28 and fluid resistance 30 are fully described and claimed in my copending application Serial No. 524,707, filed March 2, 1944, and now Patent No. 2,475,326, granted July 5, 1949, and the copending application of Frederick A. Barnes Serial No. 524,705, filed March 2, 1944, and now Patent No. 2,486,097, granted October 25, 1949.

I show an oil pump 31 driven by a motor 32 and drawing its supply of oil from a sump 33. Oil under pressure is supplied the pilot valve 28 by the pump 31 through a pipe 34. From the pilot valve 28 oil is supplied to one end or the other of the hydraulic motor 11 through the pipes 35 or 36. Drainage from the pilot 28 is returned to the sump 33 through a pipe 37. In the pipe 36 I show a hand adjustable valve 38 for variably throttling the flow of oil therethrough and thus controlling the basic rate of travel of the piston rod 12. Within any preselected range the pilot valve or relay 28 not only controls the direction of piston travel, but also the speed within said range.

In connection with the hydraulic motor 13 and adjustable fluid resistance 30 I provide switching valves 39 and 40 arranged to be moved together to three possible positions representing (1) a normal cutting condition of longitudinal travel; (2) a condition of rapid return, and (3) locked against travel. The valves 39 and 40 are shown in Fig. 2 in the "normal" operating position. Oil under pressure from the pump 31 is forced through a pipe 41, the valve 40, and a pipe 43 to one end of the hydraulic motor 13. Oil from the other end of the motor passes through a pipe 42, the valve 40, the valve 39, a pipe 44, the adjustable fluid resistance 30, and the pipe 45 to the sump 33. The regulation of the variable resistance 30 determines the rate of flow of oil through the pipe 42, and consequently the rate of travel of the piston rod 14 towards the left in the drawing Fig. 2. Thus the rate of longitudinal travel of the tool 10 along the work piece 16 is controlled by the variable resistance 30 to passage of oil therethrough from the selected end of the motor 13.

Located in the pipes 35, 36 leading to opposite ends of the hydraulic motor 11 is a transverse valve 47 adapted to shut off the pipes 35, 36, and thus lock the piston rod 12 against movement.

In general, the operation of the system illustrated in Figs. 1 and 2 is as follows: If the contacted edge of template 17 is a straight line parallel to the axis of the work 16, the air pressure established within the pipe 25 is such that the bellows 27 and 29 (and the movable parts of the assembly 28, 30 positioned thereby) provide a normal condition of operation. The pilot valve 28 locks oil in the pipes 35, 36 so that the piston rod 12 is not moving and the tool travels a cutting path parallel to the axis of the work piece 16. At the same time the variable fluid resistance 30 is in a position to provide a normal speed of travel of the piston rod 14 from right to left, thus moving the tool 10 along the work at a uniform normal rate.

If the profile of the template 17 recedes from the axis of the work piece, or advances toward the axis of the work piece, the air pressure within the pipe 25 is correspondingly varied in proper direction to increase or decrease the air pressure within the bellows 27 and 29 and to cause a corresponding positioning of the movable element of the pilot valve 28 and of the fluid resistance 30. Such movement causes the hydraulic motor 11 to position the tool toward or away from the axis of the work piece 16, and thus produce upon the work piece 16 the contour of the template 17. At the same time any departure (in either direction) of the movable element of the variable resistance 30 from normal position will increase the resistance to oil passing therethrough and tend to slow up travel of the piston rod 14. Thus longitudinal travel of the tool 10 from right to left will be at a speed slower than the normal speed depending upon the rate of travel of the tool 10 toward or away from the axis of the work piece 16. If, for example, the profile of the template 17 includes a shoulder at right angles with the axis of the work piece 16, then there will be a complete stoppage of longitudinal travel of the tool 10 while the tool is advancing directly toward the axis of the work piece or is receding directly therefrom. Movement of the tracer arm 20 either toward or away from the contacted edge of the template 17 from a normal or neutral position results in a decrease in speed of travel of the tool 10 in its longitudinal direction from its normal speed of travel, and irrespective as to whether the tool is advancing toward the axis of the work piece or is receding therefrom.

The normal cutting travel of the tool 10 is from right to left along the work piece 16. When a complete traverse of the work has been accomplished by the tool, corresponding to a complete traverse of the pattern 17 by the tracer 19, 20, further travel of the carriage 7 toward the left should be halted, the tracer 19, 20 moved away from the template 17 and the tool 10 moved away from the work 16, rotation of the work piece 16 stopped, and both tracer and tool returned to starting position at higher speed. Such an automatic operation I provide.

By providing an arrangement whereby such an automatic sequence of events may take place, I free the operator of the lathe from responsibility and necessity of being continually observant of the position of the tool 10 relative its desired total longitudinal travel, and thus allow the operator to handle two or more lathes efficiently. For example, the operator may chuck a work piece in the lathe, start it in operation and move to another machine with the assurance that the cutting travel of the tool will be accomplished, the tool returned to its starting position, and both the work piece and tool stopped from further movement until again started in normal cutting operation by the operator. I will now describe how such sequential operation is automatically performed.

In Fig. 3 I show three combinations of positions of the "longitudinal" valves 39, 40 and the "transverse" valve 47. For moving the valves 39, 40 I show (Fig. 1) a handle L and for moving the transverse valve 47 I show a handle T. I show selective positions A—B—C into which either or both the handles T and L may move. Under normal cutting conditions the handles T and L will both be in position A and the controlled valves 39, 40, 47 will assume the flow positions uppermost in Fig. 3 and as shown in the circuit diagram of Fig. 2.

In addition to the tracer body 19 the bracket 15 also supports and carries an air valve 48, as shown in diagrammatic section in Fig. 2. Air from the uniform pressure supply line 24 is supplied to the valve 48 through a pipe 49. The valve 48 includes a valve plunger 50 carrying lands 51, 52. The position of the parts 50, 51, 52 determines whether air under pressure from the pipe 49 will pass through the assembly 48 to a pipe 53 or not.

Fastened to and carried by the carriage 7 I show an air cylinder 54 having a movable piston rod 55 urged to a retracted position by a spring 56. When air under pressure from the pipe 49 is allowed to pass through the valve 48 to the pipe 53 it becomes effective upon the said piston, moving the same against the resistance of the spring 56 toward the right, and thus extending the piston rod 55 to an extreme of travel toward the right.

The operation is as follows: Assume the valves 39, 40, 47 in the normal cutting position uppermost in Fig. 3. The piston rod 14 moves the carriage 7 from right to left at a speed determined by the profile of the cam 17. The tool 10 reproduces on the work piece 16 a contour determined by the profile of the cam 17. As the tracer arm 20 reaches a desired extreme of travel it encounters a limit shoulder 57. In normal manner this results in a stoppage of movement of the piston rod 14 (and carriage 7) longitudinally toward the left. At the same time it dictates a positioning by the piston rod 12 of the cross-slide 8, the tool 10, the tracer 19, 20 and the air valve 48 toward the reader observing Fig. 1. Such movement continues until the tool 10 is safely backed away from the work piece 16 and until the movable element 50 of the valve 48 engages a stop block 58 adjustably fastened to the frame 18 and thus fixedly located relative the template 17.

As the plunger 50 is brought into engagement with the stop block 58 continued movement of the housing 48 causes a positioning of the lands 51, 52 rearwardly, thus opening passage between the pipe 49 and the pipe 53 and allowing air pressure from the pipe 49 to be effective within the cylinder 54, thereby positioning the plunger 55 toward the right into engagement with the reduced cross-section portion of the handle T and the enlarged portion of the handle L, moving the handles T, L from their location A to the position shown in Fig. 1 wherein T is at location B and L is at location C. Such movement of the handles T, L effects a shifting of the valves 39, 40, 47 to the position illustrated centrally in Fig. 3 wherein the valve 47 closes off pipes 35, 36 and prevents movement of the piston rod 12 in either direction. At the same time valves 39, 40 change the connection to the cylinder 13 as to cause the piston rod 14 to return the carriage 7 at relatively high speed toward the right.

In the meantime the locking of piston rod 12 against movement has retained the tool 10 out of possible damaging contact with the work 16 as it moves at high speed toward the right and has retained the tracer arm 20 out of possible damaging contact with the cam 17 in its travel toward the right.

As soon as the carriage 7 has moved sufficiently toward the right for the plunger 50 to clear the right-hand end of the stop block 58, then the plunger 50 moves outwardly in the housing 48 to the position shown in Fig. 2. This occurs due to the slight amount of compression given the air trapped beyond the land 51 when the plunger 50 had previously been forced inwardly by engagement with the block 58. As soon as the lands 51, 52 move to the position shown in Fig. 2, this immediately cuts off air pressure from the pipe 49 and relieves air pressure from the pipe 53. Such relief of pressure from the pipe 53 also relieves pressure within the cylinder 54, allowing the spring 56 to retract the piston rod 55 away from the handles T, L, which, however, remain in positions B and C, respectively. Since the motor 11 is rendered inoperative by the closing of valve 47, and the fluid resistance 30 has been by-passed, even though the tracer has been reconditioned for use, it will not assume control of the motors 11 and 13.

As the carriage 7 continues to move toward the right, through the agency of the piston rod 14, it eventually travels to a point where the handle L engages a stop post 59. Continued movement of the carriage 7 causes the handle L to be moved to position B directly below the handle T. With handles T and L both at position B the valve positions lowermost in Fig. 3 prevail, which is a stopped condition for both motors 11 and 13. Under this condition all movement of the carriage 7 longitudinally, or movement of the cross-slide 8 toward or away from the axis of the work piece 16 has ceased, and in effect the tracer 20 and tool 10 have been returned to their starting position at the right.

Positioned on and carried by the carriage 7 I show a cylinder 60 of generally similar construction to 54 and susceptible to air pressure through the pipe 53. The cylinder 60 has a piston rod 61 movable downwardly when fluid pressure is introduced in pipe 53, and is returnable upwardly by a spring 62 when such fluid pressure is released. The piston rod 61 of the cylinder 60 is so arranged as to engage (upon application of air pressure to the pipe 53) a handle or lever 63 on the carriage 7 controlling rotation of the work piece 16 through the agency of a motor controller 64 and the headstock motor 65. The controller 64 may be of any form suitable for stopping and starting the motor 65. Thus when air pressure is applied to the pipe 53 a functioning of the piston rod 61 moves said lever 63 to a position stopping rotation of the work piece 16. When air pressure is relieved from the pipe 53 the piston rod 61 is retracted from such lever, thus making the lever 63 available for operation by the operator when he later desires to resume rotation of the work piece. In Figure 1, the cylinder 60 is shown with the piston rod 61 extended as by the force of the air pressure, and in Figure 2 the piston rod 61 is shown retracted by the spring 62 when the air pressure is released.

It will thus be observed that I provide means for stopping the normal functioning of the machine when the cutting path has been completed and then returning the various portions of the machine to what may be termed a starting point of operation.

The sequence of normal operation is as follows:

1. The operator places the work 16 in rotation by upwardly moving lever 63 on the carriage. Assuming that the carriage 7 is at its starting position toward the right, the operator moves levers T and L to position A, then the cross-slide 8 moves the tool 10 toward the work 16 and simultaneously moves the tracer arm 20 toward the template 17 until the tracer arm engages the template. Immediately upon such engagement further transverse motion of the cross-slide 8 is stopped and longitudinal motion through the agency of the piston rod 14 is begun, moving the carriage 7 toward the left.

2. The desired cutting or shaping of the work piece 16 is accomplished by the tool 10 through the agency of the tracer arm 20 following the profile of the cam 17. This continues until the limit shoulder 57 is engaged by the tracer arm 20. Thereupon further movement of the carriage 7 from right to left ceases and further planned cutting by the tool 10 upon the work piece 16 ceases.

3. Engagement of the shoulder 57 by the tracer arm 20 causes the cross-slide 8 to be moved in proper direction to retract the tool 10 safely away from the work 16 and to retract the tracer arm 20 from the profile of the cam 17 until the plunger 50 engages stop block 58. This activates piston rod 55 and piston rod 61 to lock further movement of the cross-slide 8 in either direction, to stop rotation of the workpiece 16, and to initiate a movement of the carriage 7 from left to right at relatively high speed. When such movement toward the right has caused the handle L to engage the stop 59, then further longitudinal movement ceases. Disengagement of the plunger 50 with the stop 58 returns the pistons 54 and 60 to their initial position.

4. The tool and tracer arm have now been returned to their starting position and the work piece 16 is not rotating. The operator may, any time thereafter, place a new piece of work in the centers, start rotation, and by moving the handles L and T into position A make the tracer effective for the normal cutting travel of the tool along the work piece and for the automatic return to the starting position following a completion of the working cut.

It will thus be observed that I have provided an arrangement for automatically accomplishing operative functions of a machine which would otherwise require great care and time of an operator. Through the agency of my invention it is possible for a single operator to take care of two or more machines with full confidence that damage cannot happen to the mechanism by over-running at the end of a cutting travel.

What I claim as new, and desire to secure by Letters Patent of the United States, is:

1. In combination with a lathe having a rotatable work holder for holding a workpiece, a tool holder, power means for moving said tool holder through a cycle of operation relative to said work holder, tracer means and pattern means for controlling said power means and governing the movement of the tool holder through a part of the said cycle, said tracer means variably discharging air to atmosphere from a substantially constant pressure source in accordance with the form of said pattern means to thereby produce corresponding variations in pressure, first pressure means responsive to said variations in pressure for controlling said power means and guiding the tool holder through said part of said cycle, said pattern means having a withdrawal portion, said tracer means upon scanning said withdrawal portion governing said pressure responsive means and said power means to withdraw the tool holder away from said workpiece, and decontrol means, said decontrol means comprising air valve means having a valve actuating means, said air valve means and valve actuating means being movable with said tool holder, abutment means, said valve actuating means being positioned to contact said abutment means upon movement of the valve actuating means in response to said withdrawal movement of the tool holder, said air valve means passing air under pressure therethrough when said actuating means is actuated, disconnector means to disconnect said power means from control by said first pressure responsive means, and second pressure means responsive to air pressure passing through said air valve means for operating said disconnector means to remove the said power means from control of the first pressure responsive means for the remainder of the cycle.

2. In combination with a machine tool having a rotatable work holder for holding a workpiece, a tool holder, power means for moving said tool holder through a cycle of operation relative to said work holder, tracer means and pattern means for controlling said power means and governing the movement of the tool holder through a part of the said cycle, said tracer means variably discharging air to atmosphere from a substantially constant pressure source in accordance with the form of said pattern means to thereby produce corresponding variations in pressure, first pressure means responsive to said variations in pressure for controlling said power means and guiding the tool holder through said part of said cycle, second means independent of said tracer means for controlling said power means through the remainder of said cycle, said pattern means having a withdrawal portion, said tracer means upon scanning said withdrawal portion governing said pressure responsive means and said power means to withdraw the tool holder away from said workpiece, and decontrol means, said decontrol means comprising air valve means having valve actuating means, said air valve means and valve actuating means being movable with said tool holder, abutment means, said valve actuating means being positioned to contact said abutment means upon movement of the valve actuating means in response to said withdrawal movement of the tool holder, said air valve means passing air under pressure therethrough when said actuating means is actuated, transfer means to render said tracer means inoperative of control of said power means and to transfer said control to said second means, and second pressure means responsive to said air pressure passing through said air valve means for operating said transfer means, whereby control of said power means is transferred to the second means for the remainder of the cycle.

3. In combination with a machine tool having a relatively movable work holder and a tool holder, fluid power means for providing said relative movement through a cycle of operation, first means for controlling said fluid power means and governing the relative movements through a part of said cycle, first valve means, means responsive to said first means for variably controlling the flow of fluid through said first valve means to control the fluid power means through said part of said cycle, second valve means having a first position for selectively directing fluid under pressure to said fluid power means in a first path through said first valve means and having a second position for directing said fluid under pressure in a second path, said second path by-passing said first valve means, and decontrol means comprising means responsive to said relative movement to shift said second valve means from said first to said second position for directing said fluid from said first path to said second path, said decontrol means including third valve means and valve actuating means, said valve actuating means being positionable for operating said third valve means in response to said relative movement, said third valve means effecting a change of fluid pressure therethrough when said third valve means is actuated, disconnector means to disconnect said power means from control by said first means, and pressure means responsive to said changes of fluid pressure through said third valve means for operating said disconnector means to remove the said power means from control of said first means for the remainder of said cycle.

4. In combination with a machine tool having a relatively movable work holder and a tool holder, fluid power means for providing said relative movement through a cycle of operation, tracer means and pattern means for controlling said fluid power means and governing the relative movements through a part of said cycle, first valve means, means responsive to said tracer means for variably controlling the flow of fluid through said first valve means to control the fluid power means through said part of said cycle, second valve means having a first position for selectively directing fluid under pressure to said fluid power means in a first path through said first valve means and having a second position for directing said fluid under pressure in a second path, said second path by-passing said first valve means, said pattern means having a withdrawal portion, said tracer means upon scanning said withdrawal portion effecting a relative withdrawal between said tool holder and said work holder, and decontrol means comprising means responsive to said withdrawal movement to shift said second valve means from said first to said second position for directing said fluid from said first path to said second path, said decontrol means including third valve means and valve actuating means, said third valve means and valve actuating means having relative movement therebetween in accordance with said relative movement between said work holder and said tool holder, said valve actuating means being positionable for operating said third valve means in response to said withdrawal movement, said third valve means effecting a change of fluid pressure therethrough when said third valve means is actuated, disconnector means to disconnect said power means from control by said tracer means and pattern means, and pressure means responsive to said changes of fluid pressure through said third valve means for operating said disconnector means to remove the said power means from control of said tracer means and pattern means for the remainder of said cycle.

5. In combination with a machine tool having a relatively movable work holder and tool holder, motor means for rotating one of said holders, fluid power means for providing said relative movement through a cycle of operation, first means for controlling said fluid power means and governing the relative movements through a part of said cycle, first valve means, means responsive to said first means for variably controlling the flow of fluid through said first valve means to control the fluid power means through said part of the cycle, second valve means having a first position for selectively directing fluid under pressure to said fluid power means in a first path through said first valve means and having a second position for directing said fluid under pressure in a second path, said second path by-passing said first valve means, motor control means responsive to said relative movement for stopping said motor means, and decontrol means comprising means responsive to said relative movement to shift said second valve means from said first to said second position for directing said fluid from said first path to said second path, said decontrol means including third valve means and valve actuating means, said valve actuating means being positionable for operating said third valve means in response to said relative movement, said third valve means effecting a change of fluid pressure therethrough when said third valve means is actuated, disconnector means to disconnect said power means from control by said first means, and pressure means responsive to said changes of fluid pressure through said third valve means for operating said disconnector means to remove the said power means from control of said first means for the remainder of said cycle.

6. In combination with a machine tool having a relatively movable work holder and tool holder, motor means for rotating one of said holders, fluid power means for providing said relative movement through a cycle of operation, tracer means and pattern means for controlling said fluid power means and governing the relative movements through a part of said cycle, first valve means, means responsive to said tracer means for variably controlling the flow of fluid through said first valve means to control the fluid power means through said part of the cycle, second valve means having a first position for selectively directing fluid under pressure to said fluid power means in a first path through said first valve means and having a second position for directing said fluid under pressure in a second path, said second path by-passing said first valve means, said pattern means having a withdrawal portion, said tracer means upon scanning said withdrawal portion effecting a relative withdrawal between the tool holder and the work holder, motor control means responsive to said withdrawal movement for stopping said motor means, and decontrol means comprising means responsive to said withdrawal movement to shift said second valve means from said first to said second position for directing said fluid from said first path to said second path, said decontrol means including third valve means and valve actuating means, said third valve means and valve actuating means having relative movement therebetween in accordance with said relative movement between said work holder and said tool holder, said valve actuating means being positionable for operating said valve means in response to said third withdrawal movement, said third valve means effecting a change of fluid pressure therethrough when said third valve means is actuated, disconnector means to disconnect said power means from control by said tracer means and pattern means, and pressure means responsive to said changes of fluid pressure through said third valve means for operating said disconnector means to remove the said power means from control of said tracer means and pattern means for the remainder of said cycle.

7. In combination with a lathe having a work holder for holding a workpiece, a tool holder, fluid power means for relatively moving the tool holder and work holder through a cycle of work operations, tracer means and pattern means for controlling said fluid power means and governing the relative movements through a part of said cycle, said tracer means variably discharging air to atmosphere from a substantially constant pressure source in accordance with the form of the pattern means, first valve means, means responsive to said variations in pressure for variably controlling the flow of fluid through said first valve means to control the fluid power means through said part of the cycle, second valve means having a first position for selectively directing fluid under pressure to said fluid power means in a first path through said first valve means and having a second position for directing said fluid under pressure in a second path, said second path by-passing said first valve means, said pattern means having a withdrawal portion, said tracer means upon scanning said withdrawal portion effecting a relative withdrawal between the tool holder and the work holder, and decontrol means including means responsive to said withdrawal movement to shift said second valve means from said first to said second position for directing said fluid from said first path to said second path, said decontrol means also including third valve means and valve actuating means, said third valve means and valve actuating means having relative movement therebetween in accordance with said relative movement between said work holder and said tool holder, said valve actuating means being positionable for operating said third valve means in response to said withdrawal movement, said third valve means effecting a change of fluid pressure therethrough when said third valve means is actuated, disconnector means to disconnect said power means from control by said tracer means and pattern means, and second pressure means responsive to said changes of fluid pressure through said third valve means for operating said disconnector means to remove the said power means from control of said tracer means and pattern means for the remainder of said cycle.

8. In combination with a lathe having a rotatable work holder for holding a workpiece, motor means for rotating said workholder, a tool holder, fluid power means for relatively moving the tool holder and work holder through a cycle of work operations, tracer means and pattern means for controlling said fluid power means and governing the relative movements through a part of said cycle, said tracer means variably discharging air to atmosphere from a substantially constant pressure source in accordance with the form of the pattern means, first valve means, means responsive to said variations in pressure for variably controlling the flow of fluid through said first valve means to control the fluid power means through said part of the cycle, second valve means having a first position for selectively directing fluid under pressure to said fluid power means in a first path through said first valve means and having a second position for directing said fluid under pressure in a second path, said second path by-passing said first valve means, said pattern means having a withdrawal portion, said tracer means upon scanning said withdrawal portion effecting a relative withdrawal between the tool holder and the work holder, decontrol means including means responsive to said withdrawal movement to shift said second valve means from said first to said second position for directing said fluid from said first path to said second path, and motor control means responsive to said withdrawal movement for stopping said motor means, said decontrol means also including third valve means and valve actuating means, said third valve means and valve actuating means having relative movement therebetween in accordance with said relative movement between said work holder and said tool holder, said valve actuating means being positionable for operating said third valve means in response to said withdrawal movement, said third valve means effecting a change of fluid pressure therethrough when said third valve means is actuated, disconnector means to disconnect said power means from control by said tracer means and pattern means, and second pressure means responsive to said changes of fluid pressure through said third valve means for operating said disconnector means to remove the said power means from control of said tracer means and pattern means for the remainder of said cycle.

9. In combination with a machine tool having a relatively movable work holder and a tool holder, power means for providing said relative movement through a cycle of operation, first means for controlling said power means and governing said relative movement through a part of the said cycle, decontrol means comprising valve means and valve actuating means, said valve means and valve actuating means having a second relative movement therebetween in accordance with said first-mentioned relative movement between said work holder and said tool holder, said valve actuating means being positionable for operating said valve means in response to said second relative movement, said valve means effecting a change of fluid pressure therethrough when said valve means is actuated, disconnector means to disconnect said power means from control by said first means, and pressure means responsive to said change of fluid pressure passing through said decontrol valve means for operating said disconnector means to remove the said power means from control of said first means for the remainder of said cycle.

10. In combination with a machine tool having a relatively movable work holder and a tool holder, power means for providing said relative movement through a cycle of operation, tracer means and pattern means for controlling said power means and governing said relative movement through a part of the said cycle, said pattern means having a withdrawal portion, said tracer means upon scanning said withdrawal portion governing said power means to provide relative withdrawal movement of said work holder and said tool holder, decontrol means comprising fluid valve means and valve actuating means, said fluid valve means and valve actuating means having relative movement therebetween in accordance with said relative movement between said work holder and said tool holder, said valve actuating means being positionable for operating said fluid valve means in response to said withdrawal movement, said fluid valve means passing fluid under pressure therethrough when said valve means is actuated, disconnector means to disconnect said power means from control by said tracer means and pattern means, and pressure means responsive to fluid pressure passing through said decontrol fluid valve means for operating said disconnector means to remove the said power means from control of said tracer means and pattern means for the remainder of said cycle.

11. In combination with a machine tool having a relatively movable work holder and a tool holder, power means for providing said relative movement through a cycle of operation, tracer means and pattern means for controlling said power means and governing said relative movement through a part of the said cycle, said pattern means having a withdrawal portion, said tracer means upon scanning said withdrawal portion governing said power means to provide relative withdrawal movement of said work holder and said tool holder, decontrol means comprising air valve means having valve actuating means, said air valve means and valve actuating means being movable with said tool holder, abutment means, said valve actuating means being positioned to contact said abutment means upon movement of the valve actuating means in response to said withdrawal movement, said air valve means passing air under pressure therethrough when said actuating means is actuated, disconnector means to disconnect said power means from control by said tracer means and pattern means, and pressure means responsive to air pressure passing through said decontrol air valve means for operating said disconnector means to remove the said power means for control of said tracer means and pattern means for the remainder of said cycle.

12. In combination with a machine tool having a work holder and a tool holder, power means for providing relative movement between said work holder and said tool holder through a cycle of operation, first means for controlling said power means and governing said relative movement through a part of the said cycle, second means independent of said first means for controlling said power means through the remainder of said cycle, and decontrol means, said decontrol means comprising valve means and valve actuating means, said valve means and valve actuating means having a second relative movement therebetween in accordance with said first-mentioned relative movement between said work holder and said tool holder, said valve actuating means being positionable for operating said valve means in response to said second relative movement, said valve means effecting a change of fluid pressure therethrough when said valve means is actuated, transfer means to render said first means inoperative of control of said power means to transfer said control to said second means, and pressure means responsive to said change of fluid pressure passing through said valve means for operating said transfer means whereby control of said power means is transferred to the second means for the remainder of said cycle.

13. In combination with a machine tool having a work holder and a tool holder, power means for providing relative movement between said work holder and said tool holder through a cycle of operation, tracer means and pattern means for controlling said power means and governing said relative movement through a part of the said cycle, second means independent of said tracer means for controlling said power means through the remainder of said cycle, said pattern means having a withdrawal portion, said tracer means upon scanning said withdrawal portion governing said power means to provide relative withdrawal movement between said tool holder and said work holder, and decontrol means, said decontrol means comprising fluid valve means and valve actuating means, said fluid valve means and valve actuating means having relative movement therebetween in accordance with said relative movement between said work holder and said tool holder, said valve actuating means being positionable for operating said fluid valve means in response to said withdrawal movement, said fluid valve means passing fluid under pressure therethrough when said valve means is actuated, transfer means to render said tracer means inoperative of control of said power means to transfer said control to said second means, and pressure means responsive to said fluid pressure passing through said fluid valve means for operating said transfer means whereby control of said power means is transferred to the second means for the remainder of said cycle.

14. In combination with a machine tool having a work holder and a tool holder, power means for providing relative movement between said work holder and said tool holder through a cycle of operation, tracer means and pattern means for controlling said power means and governing said relative movement through a part of the said cycle, second means independent of said tracer means for controlling said power means through the remainder of said cycle, said pattern means having a withdrawal portion, said tracer means upon scanning said withdrawal portion governing said power means to provide relative withdrawal movement between said tool holder and said work holder, and decontrol means, said decontrol means comprising air valve means having valve actuating means, said air valve means and valve actuating means being movable with said tool holder, abutment means, said valve actuating means being positioned to contact said abutment means upon movement of the valve actuating means in response to said withdrawal movement, said air valve means passing air under pressure therethrough when said actuating means is actuated, transfer means to render said tracer means inoperative of control of said power means to transfer said control to said second means, and pressure means responsive to said air pressure passing through said air valve means for operating said transfer means whereby control of said power means is transferred to the second means for the remainder of said cycle.

CLARENCE JOHNSON.

REFERENCES CITED

The following references are of record in the file of this patent:

UNITED STATES PATENTS

| Number | Name | Date |
|---|---|---|
| 689,845 | Barrow | Dec. 31, 1901 |
| 1,711,290 | Shaw | Apr. 30, 1929 |
| 2,032,598 | Shaw | Mar. 3, 1936 |
| 2,063,414 | Tweddell | Dec. 8, 1936 |
| 2,369,904 | McKee | Feb. 20, 1945 |
| 2,372,427 | Johnson | Mar. 27, 1945 |
| 2,373,265 | Salisbury | Apr. 10, 1945 |
| 2,473,741 | Wilder | June 21, 1949 |